United States Patent [19]

Macht et al.

[11] Patent Number: 4,885,979
[45] Date of Patent: Dec. 12, 1989

[54] BRAKING-POWER BOOSTERS WITH NOISE SUPPRESSION

[75] Inventors: Egid Macht, Tretting; Thomas Hagel, Ebern, both of Fed. Rep. of Germany

[73] Assignee: FAG Kugelfischer Georg Schafer (KGaA), Fed. Rep. of Germany

[21] Appl. No.: 164,547

[22] Filed: Mar. 7, 1988

[30] Foreign Application Priority Data

Mar. 24, 1987 [DE] Fed. Rep. of Germany ... 8704366[U]

[51] Int. Cl.$^4$ ............................................. F15B 9/10
[52] U.S. Cl. .................. 91/369.1; 91/376 R; 181/230; 181/258
[58] Field of Search ............... 91/369.1, 369.2, 369.3, 91/369.4, 376 R; 181/211, 212, 230, 256, 258

[56] References Cited

U.S. PATENT DOCUMENTS

| | | | |
|---|---|---|---|
| 3,949,828 | 4/1976 | Frochaux | 181/230 |
| 4,022,112 | 5/1977 | Putt et al. | 91/376 R |
| 4,274,258 | 6/1981 | Shirai et al. | 91/376 R X |
| 4,324,314 | 4/1982 | Beach et al. | 181/230 |
| 4,535,680 | 8/1985 | Takayama et al. | 91/376 R |
| 4,572,055 | 2/1986 | Schiel | 91/376 R X |
| 4,641,568 | 2/1987 | Boehm et al. | 91/376 R X |
| 4,716,814 | 1/1988 | Yamakoshi | 91/376 R |

FOREIGN PATENT DOCUMENTS 1236123 6/1986 U.S.S.R. ............................. 181/230

Primary Examiner—Robert E. Garrett
Assistant Examiner—Mark A. Williamson
Attorney, Agent, or Firm—Ostrolenk, Faber, Gerb & Soffen

[57] ABSTRACT

A braking-power booster including a valve for controlling the pressure that acts upon the booster piston. The valve has two radially spaced valve seats, which both face toward and seal off against a valve sealing plate. With the radially inward valve seat off the valve plate, air passes through the valve. A silencer in the form of a screen is arranged directly alongside the radially inward seat that is opened off the plate. Upon air passing through the valve, the screen suppresses noise generated in the valve. The screen is of a round-wire netting, comprised of brass wire that is galvanized. The screen has a cup-shape, and its convex side faces the seat.

10 Claims, 2 Drawing Sheets

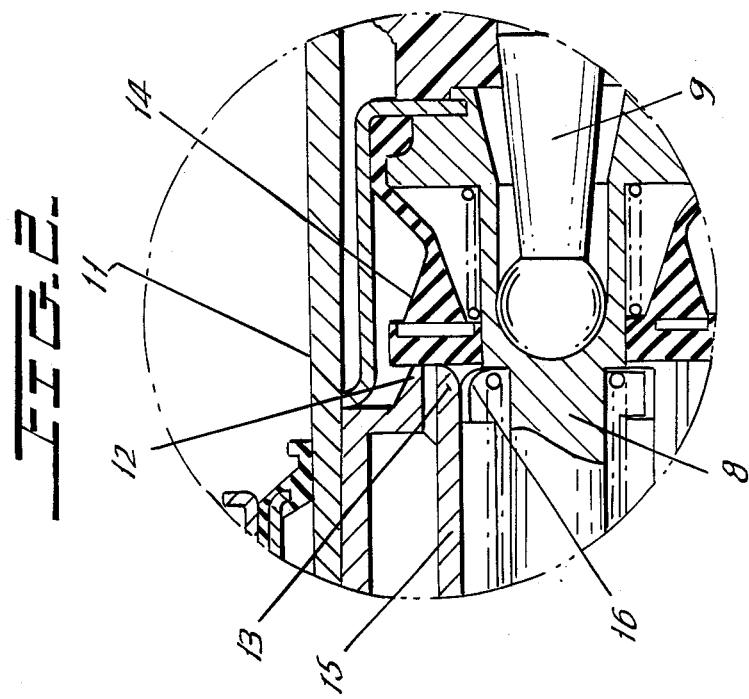

BRAKING-POWER BOOSTERS WITH NOISE SUPPRESSION

BACKGROUND OF THE INVENTION

The present invention relates to a braking-power booster including means for suppressing noise during use of the booster.

Braking-power boosters are known, for instance, from Federal Republic of Germany published application OS 34 24 410 corresponding to U.S. application Ser. No. 747,403, filed July 2, 1985. It has been found in practice that such braking-power boosters operate well. But, as a result of the immediate response of the valve upon pressure equalization, the braking-power boosters have the disadvantage that high velocities of liquid flow occur at the sealing edge of the valve seat against the plate of the valve. This produces disturbing noises from the booster. At the end of the braking process particularly, a hissing, sucking noise occurs because the atmospheric air previously present in the right pressure chamber flows with high velocity over the sealing edge into the left chamber in which there is a vacuum. The time period which the braking-power booster requires to come into its starting position should not be longer than 0.2 seconds. As a result, measures to reduce the velocity of air flow by opening the valve more slowly cannot be permitted. An object, for example a disk of porous material, like foam rubber, arranged in the flow path mitigates the development of noise occurring upon air flow. On the other hand, it considerably lengthens the reset time of the booster. Furthermore, parts of the foam rubber disk have been drawn into the sealing seat and have thus led to disturbances in operation.

SUMMARY OF THE INVENTION

It is therefore the object of the present invention to improve a braking-power booster of the aforementioned type to avoid the disturbing development of noise due to air flowing past the valve without substantially impairing the reset time.

The braking-power booster of the invention includes a valve which controls the pressure acting upon the booster piston. The valve includes a movable valve and comprises two radially spaced seats for the valve plate. The seats move separately off and on the valve plate. With one valve seat opened, alongside the sealing edge of the valve seat, a silencer in the form of a screen is arranged directly alongside the sealing edge for diminishing the noise generated by air moving past the sealing edge of the valve. That screen is comprised of netting, particularly round-wire netting. Preferably, the netting has a mesh size of about 0.16 mm, and the diameter of the wire is about 0.28 mm. For longevity and effectiveness, the screen is comprised of brass wire, and particularly the wire may be galvanized. The screen is also cup-shaped, with the convex side of the cup facing toward the sealing edge.

By arranging the screen directly behind the sealing edge of the valve seat, the velocity of air flow and thus the reset time are not detrimentally affected. Nevertheless, disturbing noises are avoided. It is advantageous to make the screen of round-wire netting. For the current sizes of braking-power boosters, this has a mesh width of 0.16 mm and a wire diameter of about 0.28 mm. For protection against corrosion, brass wire can be used. It is also advantageous to dip the screen briefly into liquid zinc so that the netting is stabilized, as this facilitates handling and mounting.

Other objects and features of the invention are explained below with reference to an embodiment shown in the drawings.

BRIEF DESCRIPTION OF THE DRAWINGS

FIG. 2 shows, on a larger scale, the region of the sealing edge and the arrangement of the screen.

DESCRIPTION OF THE PREFERRED EMBODIMENTS

Figure 1:
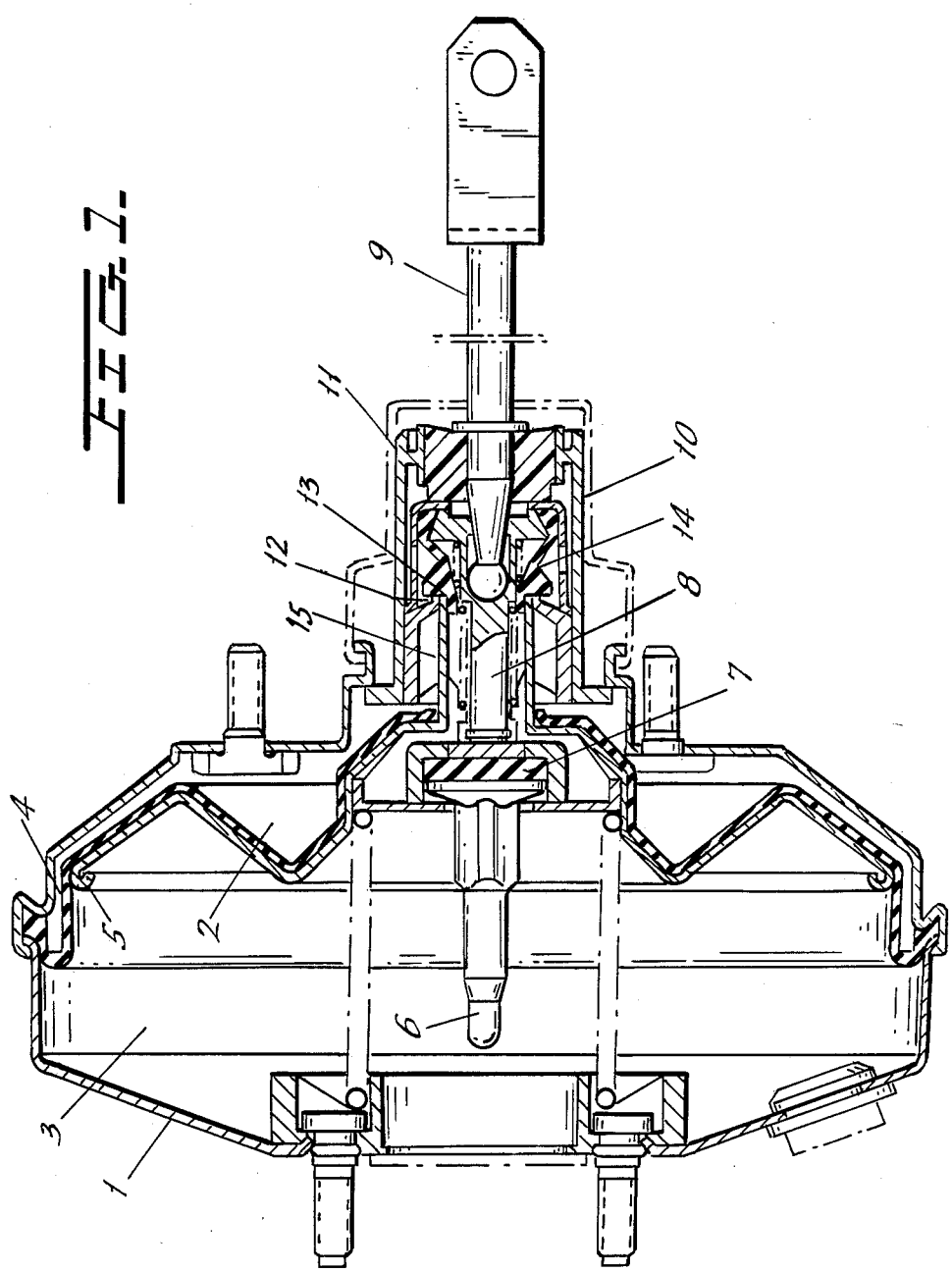
FIG. 1 is a cross-section through a braking-power booster according to the invention.

The braking-power booster of FIG. 1 has a housing 1 within which are a right-hand pressure chamber 2 and a left-hand pressure chamber 3. These chambers are sealed off from each other by the membrane or diaphragm 4 which is arranged on a brake booster piston 5.

The booster piston 5 also carries the push member 6 which acts on the master cylinder (not shown) of the brake. It carries the reaction disk 7, which is connected via an intermediate member 8 to the piston 5. rod 9. As a result of the latter connection, direct actuation of the brake is assured, even upon failure of the booster.

The intermediate member 8 and a part of the piston rod 9 are surrounded by the control valve 10 which is developed as a so-called double-seat sequential control valve. It comprises a sleeve 11 which is arranged sealed but axially displaceable in the housing cover. In the bore of the sleeve 11, there are arranged a radially outward sealing seat 12 and inside that a radially inward sealing seat 13. Also in the bore, there is a sealing plate 14 for cooperating with both of the sealing seats, which face the plate 14. The sealing seat 13 is connected via the valve shaft 15 to the booster piston 5 while the sealing seat 12 is fixed in the sleeve 11. At various times, as detailed in U.S. application Ser. No. 747,403, one or the other of the seats 12 and 13 raise off the plate 14, while the other remains against the plate 14.

The screen 16, which acts as a silencer, is arranged directly alongside the radially inner sealing seat 13. In FIG. 2, the screen 16 and the valve seats 12 and 13 can be clearly seen. When seat 13 is off plate 14, air passing the seat 13 and eventually to left side chamber 3 first passes the noise suppressing screen 16.

Features of the screen have been described above in the summary of the invention. Briefly, the screen is comprised of netting, particularly round-wire netting, wherein the screen netting has a mesh size of about 0.16 mm and the diameter of the wire is about 0.28 mm. The screen is preferably of brass wire and is preferably galvanized. As seen in FIG. 2, the screen has a generally cup-shape around the intermediate member, with the convex side of the cup facing toward the seat 13, the sealing edge of the valve 10.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A braking-power booster with noise suppression comprising:

a housing, a membrane across the housing dividing the housing into two pressure chambers; a brake booster piston extending through the housing and the membrane and through both pressure changers for moving together with the membrane; an intermediate member and a piston rod connected with the intermediate member for moving the intermediate member;

a control valve around the intermediate member, the valve comprising a sleeve sealed in and axially displaceable in the housing, the sleeve of the valve having a bore through it; a movable sealing plate in the bore and two sealing seats in the bore at a radially spaced locations for each seat moving with respect to and into and out of engagement with the sealing plate; with the radially inward valve seat off the valve plate, air passes the inward valve seat;

a silencer comprising a screen which is cup-shaped; the screen being disposed alongside the inward seat; the screen cup shape having a convex curvature facing toward the sealing valve seats, such that when the radially inward seat is opened off the valve plate, this permits the passage of air past the valve; the screen being shaped for silencing noise generated by the passage of air therethrough.

2. The braking-power booster of claim 1, wherein the screen is comprised of wire netting.

3. The braking-power booster of claim 2, wherein the wire netting has a mesh size of about 0.16 mm.

4. The braking-power booster of claim 2, wherein the screen is comprised of brass wire.

5. The braking-power booster of claim 4, wherein the screen is galvanized.

6. The braking-power booster of claim 1, wherein the screen is comprised of round wire netting.

7. The braking-power booster of claim 6, wherein the wire netting has a mesh size of about 0.16 mm.

8. The braking-power booster of claim 7, wherein the diameter of the wire is about 0.28 mm.

9. The braking-power booster of claim 6, wherein the diameter of the wire is about 0.28 mm.

10. The braking-power booster of claim 9, wherein the round-wire mesh size is about 0.16 mm and the diameter of the wire is about 0.28 mm.

* * * * *